United States Patent [19]

Hodgdon

[11] Patent Number: 5,616,249

[45] Date of Patent: Apr. 1, 1997

[54] NANOFILTRATION APPARATUS AND PROCESSES

[75] Inventor: Russell B. Hodgdon, Sudbury, Mass.

[73] Assignee: Ionics, Incorporated, Watertown, Mass.

[21] Appl. No.: 665,585

[22] Filed: Jun. 18, 1996

Related U.S. Application Data

[63] Continuation of Ser. No. 304,031, Sep. 9, 1994, abandoned, which is a continuation of Ser. No. 63,799, May 20, 1993, abandoned.

[51] Int. Cl.$^6$ .................................................. B01D 61/00
[52] U.S. Cl. ........................ 210/651; 210/652; 210/653; 210/654; 210/500.37; 210/500.38; 210/321.72
[58] Field of Search .................................. 210/650, 651, 210/652, 653, 654, 637, 500.27, 500.37, 500.38, 321.6, 321.72

[56] References Cited

U.S. PATENT DOCUMENTS

| | | | |
|---|---|---|---|
| 3,744,642 | 7/1973 | Scala et al. | 264/41 |
| 4,005,012 | 1/1977 | Wrasidlo | 210/500.38 |
| 4,123,424 | 10/1978 | Credali et al. | 210/500.38 |
| 4,259,183 | 3/1981 | Cadotte | 210/654 |
| 4,765,897 | 8/1988 | Cadotte et al. | 210/500.23 |
| 4,812,270 | 3/1989 | Cadotte et al. | 210/500.38 |
| 4,872,991 | 10/1989 | Bartels et al. | 210/651 |
| 4,960,518 | 10/1990 | Cadotte et al. | 210/639 |
| 5,158,683 | 10/1992 | Lin | 210/651 |
| 5,160,619 | 11/1992 | Yamaguchi et al. | 210/500.38 |

*Primary Examiner*—Ana Fortuna
*Attorney, Agent, or Firm*—Lappin & Kusmer LLP

[57] ABSTRACT

Improved nanofiltration apparatus and processes utilizing thin film composite asymmetric nanofiltration membranes in which the thin film semi-permeable barrier layer consists of substantially "all aliphatic" polymer(s) prepared, for example, by the interfacial polymerization of one or more aliphatic monomers having two or more substituents selected from the group consisting of primary and secondary amine substitutents with one or more aliphatic monomers having two or more acid halide substituents. The monomers are linked together in the thin film substantially exclusively by amide linkages.

12 Claims, No Drawings

NANOFILTRATION APPARATUS AND PROCESSES

This application is a continuation of application Ser. No. 08/304,031, now abandoned, filed Sep. 9, 1994, which is a continuation of application Ser. No. 08/063,799, filed May 20, 1993 and now abandoned.

FIELD OF THE INVENTION

This invention pertains to improved nanofiltration apparatus and processes for the treatment of feed streams (such as surface waters, seawater, liquid dairy products and fermentation broths) which streams contain organic substances which normally cause serious flux degeneration during nanofiltration, particularly to such processes in which:

dissolving and/or dispersing liquid is separated from dissolved and/or dispersed (that is, colloidal) organic substance(s) generally having molecular weights exceeding about 300 Daltons by forcing such liquid through nanofiltration membrane, the membrane substantially retaining such organic substance(s); or dissolving and/or dispersing liquid and ionized uni-univalent low molecular weight electrolytes (i.e. having molecular weights less than about 300 Daltons) are separated from dissolved and/or dispersed (that is, colloidal) organic substance(s) generally having molecular weights greater than about 300 Daltons and from at least partially ionized electrolytes in which at least one of the ionic moieties thereof has two or more unit electrical charges by forcing such liquid through a nanofiltration membrane, the membrane substantially retaining such organic substance(s) and such electrolyte in which at least one of the ionic moieties thereof has at least two electrical charges.

By way of examples without limitation:

whey may be separated with a variety of such nanofiltration membranes into a permeate containing primarily water and sodium and potassium chlorides (and other uni-univalent electrolytes) and a retentate containing lactose, protein and electrolytes in which at least one of the ionic moieties thereof has two or more electrical charges;

whey may be separated with another variety of such membranes into a permeate containing water, electrolytes and lactose and a retentate containing protein;

seawater may be separated into a permeate containing primarily water and sodium chloride and a retentate containing magnesium sulfate and dissolved or colloidal organic matter generally having molecular weights in excess of about 300 Daltons. The permeate may be readily demineralized by known reverse osmosis processes and/or concentrated by known electrodialysis processes, fermentation broths may be separated into a permeate containing water and a concentrated retentate comprising organic substances generally having molecular weights greater than about 300 Daltons. Such substances may, for example, have valuable pharmaceutical and/or enzymatic properties.

Utilizing the novel, thin film composite or other asymmetric membranes disclosed herein, the above mentioned and other separations can be carried out with substantially less degradation of flux compared to that experienced with membranes known in the art. The thin films ("barrier layers") of such novel membranes are substantially totally aliphatic "polyamides" on and/or in one surface of suitable microporous polymer sheets such as microporous polysulfone, polyvinylidene fluoride, or polyamide.

BACKGROUND OF THE INVENTION

When membranes suitable for filtering out bacteria and smaller entities were developed by Zsigmondy and others between World Wars I and II, all such membranes were known as ultrafiltration membranes. At the present state of the art the definition of "ultrafiltration membranes" has been narrowed and additional loosely defined names introduced:

"Micro filtration membranes" having pore sizes roughly in the range of about 0.02 to about 10 micrometers and suitable for removing bacteria from fluids but in the unfouled state not suitable for removing colloids such as proteins. Such pores are an integral part of the membrane structure and are maintained in the dry state. With such membranes in the unfouled state, significant equilibrium osmotic pressure differences cannot be developed and must not be overcome in use;

"Ultrafiltration membranes" having pore sizes roughly in the range of from about 1 to about 20 nanometers and suitable for removing both bacteria and colloids such as proteins or dissolved high molecular weight polymers. With such membranes even in the unfouled state, significant equilibrium osmotic pressure differences can be developed (e.g. in concentrated solutions or dispersions of such proteins or of high molecular weight polymers in which the activity of water has been significantly reduced). Such significant osmotic pressure differences may often have to be overcome in use;

"Reverse Osmosis" or "Hyperfiltration membranes" which are usually regarded as having no "true" pores, that is having only interconnected interstices (voids of the order of magnitude of nanometers) between polymer segments of the barrier layer of the membrane which interstices are occupied by solrating liquids and low molecular weight solutes dissolved therein. Such membranes are conveniently regarded as operating by a solution/diffusion mechanism, that is the barrier layer is at least partly swollen by liquid having cohesive energy densities due to polar and hydrogen bonding forces not too different respectively from those of the polymers of the barrier layer. Molecules of the swelling liquid migrate through the barrier layer by an activated diffusion process i.e. as individual molecules jumping from one equilibrium site to an adjacent one. There is no substantial bulk flow of the swelling liquid. Solutes dissolved in the swelling liquid will generally be at least partially excluded from the barrier layer if such solutes have polar and hydrogen bonding cohesive energy densities substantially different respectively from those of the swollen polymer of the barrier layer. Such exclusion can apply as well to ionized electrolytes dissolved in the swelling liquid. If the swollen barrier layer has a low dielectric constant (related to the polar cohesive energy density) compared to the pure swelling liquid, then dissolved ions will tend to prefer the external swelling liquid phase compared to the swollen barrier layer. Ions having two or more actual unit electrical charges will tend to be more strongly excluded than ions having a single unit electrical charge. (Exceptions are found for example in the case of di- or tri-valent cations which may have specific binding interactions with moieties (e.g. amines) in the polymer of the barrier layer. Such specifically bound ions generally have greatly reduced mobilities in the barrier layer and hence do not significantly penetrate the latter). Ions dissolved in the swelling liquid will also tend to be excluded from the barrier layer if the latter contains a significant concentration of fixed charged groups having the same charge sign as that of such dissolved ions. (Such exclusion is often referred to as Donnan Exclusion). A high concentration of fixed charged groups may tend to include ions having two or more unit charges of sign opposite to that of such fixed charged groups, such inclusion compared to ions having a single unit charge opposite in sign to that of the fixed charged groups. Substances dissolved or dispersed in the swelling liquid which substances in such dissolved or dispersed state have sizes larger than the interconnections between the interstices in the barrier layer will in general also be excluded from the latter even if such substances have polar and hydrogen bonding cohesive energy densities similar respectively to those of the polymer(s) of the barrier layer. Solutes dissolved in the barrier layer by whatever mechanism will tend to diffuse across such layer in response to a free energy gradient. Solutes will tend to diffuse slowly if they have specific binding interactions with the polymer(s) of the barrier layer and/or have sizes similar to those of the interconnections between the interstices in such layer.

"Nanofiltration membranes" are a variety of hyperfiltration membrane in which the properties have been adjusted to offer little rejection of dissociated uni-univalent electrolytes but substantial rejection of non-univalent ions such as magnesium, calcium and sulfate. Typically such membranes may reject dissolved organic compounds having molecular weights greater than about 300 Daltons (e.g. disaccharides).

In this specification and the appended claims "nanofiltration membranes" are defined as membranes which reject less than about 50% of sodium chloride when challenged at about room temperature and at about 225 pounds per square inch trans-membrane pressure difference with a solution in water containing about 2000 milligrams of sodium chloride per liter and which in a separate test reject more than about 50% of magnesium sulfate when challenged at about room temperature and at about 225 pounds per square inch trans-membrane pressure difference with a solution in water containing about 2000 milligrams of magnesium sulfate per liter. Such membranes typically reject 90% or more of albumin but may or may not reject a substantial fraction of disaccharides.

DISCUSSION OF RELATED ART

It is well known that reverse osmosis (hyperfiltration), nanofiltration and ultrafiltration membranes are subject to flux degeneration when processing solutions or dispersions containing charged colloids or charged organic compounds having molecular weights in excess of about 300 Daltons. Such flux degradation can occur for example in processing brackish water containing humic and/or fulvic acids, in processing seawater having even normal concentrations of dissolved and suspended organic matter, in processing fermentation broths and in concentrating whole or skim milk or cheese whey or separating such milk or whey into a retained protein concentrate and a permeated lactose solution. Much has been written about such flux deterioration but even after many years of research the phenomenon remains with us, seriously interfering with many membrane separation processes. A typical remedy is to remove the material(s) which cause(s) such flux decay before the liquid containing such material(s) is subjected to the membrane separation process. Alternatively the membrane containing apparatus and/or the membranes therein may be flushed more or less frequently with water or solutions of chemicals designed to remove the material(s) which have caused the flux reduction, in either case substantially increasing the cost of the process.

It is disclosed herein that flux degradation can be substantially reduced when thin film, composite or other asymmetric membranes are utilized, in which the thin film barrier layer consists substantially only of "all aliphatic" polymer(s) prepared for example by the interfacial polymerization of one or more aliphatic monomers having two or more substituents selected from the group consisting of primary and secondary amine substituents with one or more aliphatic monomers having two or more acid halide substituents. U.S. Pat. No. 5,160,619 discloses thin film composite reverse osmosis membranes having a high salt rejection and prepared by interfacial polymerization of various aromatic and aliphatic amines with various aromatic and aliphatic acid halides. Among the aliphatic amines are listed cyclohexane diamine, piperazine, N-phenylethylene diamine (sic) and xylylenediamine (sic). (The latter two compounds are not substantially all aliphatic). Among the aliphatic acid halides are listed 1,2,3-propane tricarboxylic acid trichloride, 1,2,4-butane tricarboxylic acid trichloride, 1,2,3,4-butane tetracarboxylic acid tetrachloride, 1,2,4,5-pentanetetracarboxylic acid tetrachloride, glutaryl halide, adipoyl halide, 1,3-cyclohexane carboxylic acid halide, 1,4 cyclohexane dicarboxylic acid halide and 1,3,5-cyclohexane tricarboxylic acid halide. Microporous polysulfone, polyether sulfone or polyvinylidene fluoride substrates are disclosed. In the 10 examples of U.S. Pat. No. 5,160,619 only aromatic diamines are used and only in Example 1 is the acid halide an aliphatic acid halide (1,2,3,4-butanetetracarboxylic acid tetrachloride). The membranes were challenged at 213 psi with an aqueous solution having 1500 ppm of sodium chloride. Salt rejections were in the range of 95 to 99.8% i.e. the membranes were not nanofiltration membranes. The membranes were not challenged with solutions containing materials causing flux degeneration. It is not disclosed in or hinted at in nor is it obvious from U.S. Pat. No. 5,160,619 that nanofiltration membranes in which the thin film barrier layer consists substantially only of "all aliphatic" polymer(s) exhibit lower flux degradation than such membranes in which the film does not consist substantially only of such polymer(s).

U.S. Pat. No. 4,005,012 also pertains to thin film, composite reverse osmosis membranes prepared by interfacial polymerization of amine modified polyepihalohydrins with acid halides (diacyl halides), anhydrides, diisocyanates, dithioisocyanates, chloroformates and sulfonyl chlorides. Among amines which may be employed to modify the polyepihalohydrins are listed ethylene diamine, diaminopropane, diaminobutane, diaminopentane, diaminohexane, diaminoheptane, diaminooctane, diaminononane, diaminodecane, diethylene triamine, dipropylene triamine, dibutylene triamine, triethylene tetramine, tripropylene tetramine, tributylene tetramine, tetraethylene pentamine, pentaethylene hexamine, diamino cyclobutanes, diamino cyclopentanes, diaminocyclohexanes, diaminocycloheptanes, and diaminocyclooctanes.

Among acid halides (i.e. diacyl halides) which may be reacted with the amine modified epihalohydrins in an interfacial reaction are listed various acid halides having a single acid halide substituent as well as oxalyl chloride, malonyl chloride, succinyl chloride and glutaryl chloride. In the examples, membranes were prepared from ethylene diamine modified polyepichlorohydrin and isophthaloyl chloride (not an aliphatic acid chloride) (Ex. I); polyethylene imine and isophthaloyl chloride (Ex. I); ethylene diamine modified polyepichlorohydrin and toluene diisocyanate (not an aliphatic acid halide) (Ex. II); ethylene diamine modified polyepibromohydrin and acetic anhydride (not an aliphatic acid halide) (Ex. III). The membranes were challenged with 3.5% aqueous sodium chloride solution at trans-membrane pressures in the range from 600 to 1000 psi. Sodium chloride rejections were in excess of 95% in all cases, i.e. the membranes were not nanofiltration membranes. The membranes were not challenged with solutions containing material(s) causing flux degeneration. It is not disclosed in or hinted at in nor is it obvious from U.S. Pat. No. 4,005,012 that nanofiltration membranes in which the thin film consists substantially only of all aliphatic polymer(s) exhibit lower flux degradation with solutions containing material(s) causing flux degeneration than such membranes in which the film does not consist substantially only of such polymer(s).

U.S. Pat. No. 3,744,642 discloses thin film, composite reverse osmosis membrane prepared by interfacial polymerization of various amines and acid halides. The following aliphatic amines are listed: piperazine, guanidine, ethylene diamine, 1,2-propane diamine, 1,3-propane diamine, 1,4 butane diamine, 1,5-pentans diamine and 1,6-hexane diamine. Aliphatic (including alicyclic) primary or secondary diamines or triamines are disclosed as a class. Aliphatic (including alicyclic) diacyl (di-acid) halides are disclosed as a class. Adipyl and sebacyl chlorides are specifically listed. Examples 1,3, 4 and 5 disclose all aliphatic thin film composite reverse osmosis membranes. The membranes were challenged at 600 psi with an aqueous solution containing 5200 ppm of salt. Assuming the solution/diffusion mechanism for both salt and water (i.e. that there is not substantial coupling between salt and water fluxes), then salt rejections may be extrapolated to 225 psi by the formula:

$$\left(\frac{1}{R}-1\right)P=\left(\frac{1}{R'}-1\right)P'$$

where R is the rejection at pressure P and R' is the rejection at pressure P'. The formula also assumes the reversible osmotic pressure between the feed and the permeate is small compared to the trans-membrane pressure. The solution/diffusion mechanism also assumes the water and salt diffusion coefficients are independent of the thickness of the barrier films and therefore the rejection is independent of the film thickness at constant applied pressure.

The extrapolated salt rejection at 225 psi are on such bases: Example 1, 60%; Example 3, 24%; Example 4, 68%; and Example 5, 17%. No data is given in U.S. Pat. No. 3,744,642 on rejection of divalent salts and it is not possible therefore to judge whether the membranes of Examples 3 and 5 are nanofiltration membranes or only leaky membranes. None of the membranes were challenged with solutions containing materials causing flux degradation. It is not disclosed in or hinted at in nor is it obvious from U.S. Pat. No. 3,744,642 that nanofiltration membranes in which the thin film consists substantially only of all aliphatic polymer(s) exhibit lower flux degradation than such membranes in which the film does not consist substantially only of such polymer(s).

SUMMARY OF THE INVENTION

It is an objective of the present invention to provide thin film, composite or other asymmetric membranes which are useful in nanofiltration applications, which membranes are more resistant to flux degradation caused by organic materials than are thin film composite membranes known in the art.

It is another objective to provide nanofiltration processes and apparatus which are more resistant to flux degradation than are such processes and apparatus known in the art.

According to this invention the above objectives are met by providing thin film, composite or other asymmetric membranes prepared for example by interfacial polymerization of one or more aliphatic monomers having two or more substituents selected from the group consisting of primary and secondary amine substituents with one or more aliphatic monomers having two or more acid halide substituents. The monomers are linked together by amide linkages.

DETAILED DESCRIPTION OF THE INVENTION

Commercially available nanofiltration membranes are subject to flux degradation caused by organics in the liquids processed. Such membranes are typically prepared by interfacial polymerizations in which at least one of the monomers is aromatic e.g. by polymerization of metaphenylene diamine ("MPD"), 1,3,5-benzene tricarboxylic acid trichloride (trimesoyl chloride, "TMC") optionally also with 1,3-benzene dicarboxylic acid dichloride (isophthaloyl chloride, "IPC") or by polymerization of piperazine with the above acid chlorides. Applicant hypothesized that the above mentioned flux degradation was associated with the aromatic monomer residues in such commercial membranes i.e. with MPD, TMC and IPC. To test such hypothesis a number of nanofiltration membranes were made with and without aromatic monomers. The results are summarized in the following representative examples in which all concentrations are expressed in weight percent unless otherwise specified. In each of the examples a polysulfone ultrafiltration membrane prepared on woven polyester fabric was immersed in water having a temperature of about 60° C. and then in a pure water solution containing about 0.42 percent of a first amine, about 0.08 percent of a second amine and about 0.5% sodium hydroxide (as an acid acceptor) as shown in Table 1. (The amine solution in Example C2 also contained latex). The excess amine solution was removed from the ultrafiltration membranes by rolling a plastic or rubber roller over them. The membrane containing the aqueous amine solution was then covered with a 0.5% solution of an acid chloride in hexane for 45 seconds (120 seconds in Example 2). The membranes were removed from the hexane solution, air dried for 1 minute and then dried at 105° C. for at least 1 minute.

Examples 1 and 2 are in accordance with this invention; all the monomers are aliphatic. Examples C1, C2, C3 and C4 are comparative examples; one of the monomers is not aliphatic.

The abbreviations in Table 1 have the following meanings:

CHDA: trans-1,4-diamino cyclohexane

TEPA: tetraethylene pentamine

CHTCC: cis-1,3,5-cyclohexane tricarboxylic acid trichloride (the aliphatic analogue of TMC, see below)

FC: fumaric acid dichloride

TMC: 1,3,5-benzene tricarboxylic acid trichloride (also called trimesoyl chloride, the aromatic analogue of CHTCC, (see above)

Pip: piperazine

TABLE 1

| Example | First Amine | Second Amine | Acid Chloride |
|---------|-------------|--------------|---------------|
| 1       | CHDA        | TEPA         | CHTCC         |
| 2       | "           | "            | "             |
| C1      | "           | "            | FC            |
| C2      | "           | "            | TMC           |
| C3      | Pip         | Pip          | "             |
| C4      | "           | "            | "             |

The membranes prepared as above were challenged with four different solutions at room temperature and a transmembrane pressure difference of 225 psi:

Solution A:
2000 ppm magnesium sulfate in water. Results are shown in Table 2.

Solution B:
2000 ppm sodium chloride in water. Results are shown in Table 2.

Solution C:
4700 ppm lactose, 200 ppm potassium chloride, 112 ppm sodium chloride in water. Results are shown in Table 2.

Solution D:
natural (that is, not concentrated), sweet, cheddar cheese whey filtered through a 0.1 miocron filter. Results are shown in Table 3.

TABLE 2

| Ex-<br>am-<br>ple | Solution A | | Solution B | | Solution C | | |
|---|---|---|---|---|---|---|---|
| | | | | | | Lactose | Chloride |
| | (Flux | Rej.) | (Flux | Rej.) | (Flux | Rej. | Rej.) |
| 1  | 26 | 95 | 38  | 16  | 26 | 99  | 15 |
| 2  | 16 | 94 | 26  | 12  | 8  | 100 | 38 |
| C1 | 23 | 83 | 30  | 27  | —  | 88  | —  |
| C2 | 25 | 99 | 34  | 32  | 24 | 97  | 35 |
| C3 | 35 | 88 | >40 | <45 | —  | —   | —  |
| C4 | 26 | 91 | >40 | <45 | —  | —   | —  |

TABLE 3

| Ex-<br>amp. | a +<br>b | a | c | S.E. | $R^2$ | F-<br>Ratio | Crit.<br>F-<br>ratio | Organics<br>Rejection |
|---|---|---|---|---|---|---|---|---|
| 1  | 30.50 | 4.09  | 14.4 | 0.14 | 1.00 | 299 | 5.5 | 88 |
| 2  | 5.90  | 2.44  | 6.39 | 0.20 | 0.91 | 15  | 5.5 | 87 |
| C1 | 4.39  | 0.10  | 1.02 | 0.12 | 0.94 | 16  | 9.0 | 83 |
| C2 | 2.31  | 0.03  | 1.84 | 0.09 | 0.95 | 27  | 5.5 | 90 |
| C3 | 12.80 | −0.07 | 6.58 | 0.39 | 0.98 | 41  | 9.0 | 85 |
| C4 | 7.12  | 0.24  | 7.91 | 0.05 | 1.00 | 499 | 9.0 | 83 |

In Table 2 the flux is expressed as gallons per square foot per day. "Rej." means "Rejection". In the challenge with Solution D (Table 3) the average flux rate in gallons per square foot per day ("GFD") over successive permeate samples of about 0.067 gallons per square foot ("GF") was correlated with the expression GFD=a+b exp(-cGF) where "a+b" is the extrapolated (smoothed) initial flux rate in gallons per square foot per day, "a" is the steady state flux rate in gallons per square foot per day approached as GF becomes very large and "c" is the exponential degradation rate per cumulative gallons per square foot (GF) permeate.

In Table 3 "S.E." is the standard error of the correlation, "$R^2$" is the coefficient of determination (equal to RSS/(RSS+ ESS) where "RSS" is the regression sum of squares of the correlation and "ESS" is the error sum of squares), "F-Ratio" is the signal to noise ratio and "Crit. F-Ratio" is the critical F-Ratio at the 90% confidence level.

DISCUSSION OF THE EXAMPLES

It will be seen that the correlation of the data with the expression $$GFD = a + b \exp(-cGF)$$

is quite good (Table 3). Table 2 shows that all the membranes had excellent rejection of the di-di-valent salt magnesium sulfate (greater than 88%) and poor rejection of sodium chloride (less than 45%). In accordance with the definition in this specification the membranes are therefore nanofiltration membranes. The critical difference between the membranes according to this invention (Examples 1 and 2) and those according to the Comparative Examples (Examples C1, C2, C3 and C4) is shown in Table 3. During the filtration of whey in the case of the membranes according to this invention, the flux per unit area tended to stabilize in a relatively short time at a finite value whereas in the case of membranes according to the Comparative Examples the flux tended to stabilize only at substantially zero flux (see the column labeled "a" in Table 3. In Example C3 the standard error (S.E.) is 0.39 and "a" is therefore quite likely to be in the range −0.46 to +0.32 GFD). The membranes of Examples C1 and C2 are made in the same way as that of Example 1 except the aliphatic acid chloride of Example 1 was replaced by the non-aliphatic acid chloride fumaric acid dichloride in Example C1 and by the non-aliphatic acid chloride benzene tricarboxylic acid trichloride in Example C2. In Comparative Examples C3 and C4 the cyclohexane diamine and tetraethylene pentamine of Comparative Example C2 are changed to piperazine showing that it is not the combination of CHDA and TEPA with TMC which leads to essentially zero steady state flux with natural whey.

Some or all of the CHDA and/or TEPA of Examples 1 and 2 may be replaced with other aliphatic amines such as piperazine, ethylene diamine, diaminopropanes, diaminobutanes, diaminopentanes, diaminohexanes, diaminoheptanes, diaminooctanes, diaminononanes, diaminodecanes, diethylene triamine, dipropylene triamine, dibutylene triamine, triethylene tetramine, tripropylene tetramine, tributylene tetramine, pentaethylene hexamine, diaminocyclobutanes, diaminocyclopentanes, diaminocycloheptanes, diaminocyclooctanes, guanidine, aminoethyl piperazine, imino bis propyl amine, menthane diamine, 1,4-diamino-2-butanone, diamino dodecanes, diamino-2-hydroxy propane, trisaminoethylamine, bis(p-amino cyclohexyl) methane, N,N'-bis(3-aminopropyl)-1,4-butane diamine.

Some or all of the CHTCC of Examples 1 and 2 may be replaced with aliphatic acid halides such as other cyclo hexane tricarboxylic acid trihalides, 1,2,3-propane tricarboxylic acid trihalides, 1,2,3,4-butane tetracarboxcylic acid tetrahalides, 1,2,4,5-pentane-tetracarboxylic acid tetrahalides, glutaryl halides, adipoyl halides, 1,3-cyclohexane dicarboxylic acid halides, 1,4-cyclohexane dicarboxylic acid halides, oxalyl halides, malonyl halides and succinyl halides. The chlorides are preferred.

The sodium hydroxide used as an acid acceptor in Example 1 and 2 may be replaced in whole or in part with other inorganic hydroxides, with tertiary amines or quaternary ammonium hydroxides.

The microporous polysulfone substrate used in Examples 1 and 2 may be replaced with microporous polyether sulfone, polyvinylidene fluoride, polyamide or other microporous polymer sheets well known in the art.

It is preferred that the polymer(s) of the thin film of the composite membranes of this invention be crosslinked and for such purpose it is preferred that the average number of primary and/or secondary amine groups in the amine monomers used be greater than 2 and/or that the average number of acid halide groups in the acid halide monomers used be greater than 2. If A+2 is equal to the average number of amine groups in the amine monomers per mol of such monomers and C+2 is equal to average number of carboxylic acid halide groups in the acid halide monomers per mol of such monomers then it is particularly preferred if the sum of A and C is greater than 0.1. It is most preferred if C is substantially greater than A, that is, that there be a substantial excess of acid halide groups.

The thin film composite membranes of the examples are a sub-class of the class of asymmetric semi-permeable membranes having a semi-permeable barrier layer on one surface, the remainder of the membrane being more porous i.e. less semi-permeable than the barrier layer, the barrier layer consisting substantially of aliphatic polyamide(s). In the examples the barrier layers were interfacial (interphasal) polymerizates formed on pre-formed porous substrates. Suitable asymmetric membranes according to this invention having barrier layers consisting substantially only of one or more aliphatic polyamides may also be formed by other means such as:

dip coating of a suitable porous substrate with a dilute solution of aliphatic polyamide followed by evaporation of the solvent at room temperature and/or an elevated temperature. Preferably the resulting barrier layer becomes crosslinked during the drying step, is heated to induce such crosslinking or is crosslinked in a separate procedure;

precipitation by controlled evaporation of solvent from a thin layer of a solution of aliphatic polyamide(s) in a mixture of solvent and non-solvent for the polymer(s);

evaporation of solvent from a thin layer of solution of aliphatic polyamide(s) to form a thin skin on such layer followed by a substantial temperature change to induce precipitation;

casting a thin layer of a solution of aliphatic polyamide(s) on a suitable support (e.g. a fabric) followed by immersing the thin layer and support in a coagulation bath containing a poor solvent and/or non-solvent for the polyamide(s).

The membranes according to this invention may be in the form of flat sheets, spiral-wound flat sheets, tubes, spaghetti, hollow fibers, hollow fine fibers or other suitable configurations. The semi-permeable barrier layers may be on the inside or the outside of the tubes, spaghetti, hollow fibers or hollow fine fibers. In the case of hollow fine fibers the latter may consist entirely of the semi-permeable barrier layer.

Although it is preferred that the semi-permeable barrier layer according to this invention consist exclusively of aliphatic polyamide it is within the scope of this invention for such barrier layer also to comprise polymer having comparatively minor amounts of non-aliphatic moieties and/or substituted urea moieties (e.g. from the reaction of isocyanate moieties with amino moieties), substituted urethan moieties (e.g. from the reaction of isocyanate moieties with hydroxyl moieties) and/or ester moieties (e.g. from the reaction of hydroxyl moieties with acid halide moieties). Aliphatic polyamide(s) containing minor amounts of such non-aliphatic-polyamide moieties and/or polymers are referred to herein and in the appended claims as substantially exclusively aliphatic polyamide(s) and equivalent descriptions.

The aliphatic monomers according to this invention may contain non-aromatic substituents which do not substantially interfere with the ability of the monomers to form polyamides, such substituents including for example chloro or fluoro substituents not substituted on an acid moiety, nitro, tertiary amine, quaternary amine, hydroxyl, carboxylic acid, sulfonic acid substituents, ether, thioether (sulfide) and sulfone linkages.

It has been pointed out above that it is preferred that the semi-permeable barrier layer be crosslinked. Such crosslinks may be formed during the formation of the barrier layer or subsequent thereto for example by heat treatment or by chemical treatment. For example if the barrier layer contains primary or secondary amine groups the membrane may be contacted with an aliphatic compound having two or more acid halide groups, with formaldehyde, with isopharondiisocyanate ("IPDI") and/or trimethylhexamethylenediisocyanate ("TMDI") or with other compounds having two or more functional groups which groups are reactive with amines, such compounds being well known in the art.

I claim:

1. A process for separating an aqueous mixture into less permeable and more permeable fractions, comprising the steps of:

a) contacting said aqueous mixture under pressure with a nanofiltration membrane comprising a barrier layer consisting essentially of a polymerizate of one or more first aliphatic monomers having as a molar average A+2 substituents selected from the group consisting of primary and secondary amines with one or more second aliphatic monomers having as a molar average C+2 substituents combinable with primary or secondary amines, A and C being real numbers greater than or equal to zero, the sum of A and C being at least about 0.1 and thus A and C not both being equal to zero simultaneously, said membrane having a steady state flux "a" of at least about 2 gallons per square foot per day when the membrane is challenged at about room temperature and about 225 pounds per square inch trans-membrane pressure difference with fresh, natural, sweet, cheddar cheese whey, said steady state flux "a" determined by fitting the flux "GFD" in gallons per square foot per day through said membrane versus the cumulative volume of liquid "GF" in gallons per square foot passed through said membrane, by a least squares method, to the relationship:

$$GFD = a + b \exp(-cGF)$$

where "a" is the steady state flux in gallons per square foot per day, "a+b" is the extrapolated initial flux rate in gallons per square foot per day, "c" is the exponential degradation rate per cumulative gallons per square foot permeate, and "GF" is the cumulative volume of liquid passed through said membrane in gallons per square foot; and b) recovering the liquid passing through the membrane.

2. The process of claim 1, wherein the aqueous mixture is milk or an aqueous derivative thereof.

3. The process of claim 1, wherein the aqueous mixture is seawater.

4. The process of claim 1, wherein the first aliphatic monomer is selected from the group consisting of a cyclohexane diamine, tetraethylene pentamine, ethylene diamine, a diaminopropane, a diaminobutane, a diaminopentane, a diaminohexane, a diaminoheptane, a diaminooctane, a diaminononane, a diaminodecane, diethylene triamine, a dipropylene triamine, a dibutylene triamine, triethylene tetramine, a tripropylene tetramine, a tributylene tetramine, pentaethylene hexamine, a diamino cyclobutane, a diamino cyclopentane, a diamino cycloheptane, a diamino cyclooctane, guanidine, aminoethyl piperazine, an imino bis propyl amine, bis-(p-amino cyclohexyl) methane, N,N'-bis-(3-amino propyl)-1,4-butane diamine, a menthane diamine, 1,4-diamino-2-butanone, a diaminododecane, diamino-2-hydroxy propane, and trisaminoethyl amine.

5. The process of claim 1, wherein the first aliphatic monomer is selected from the group consisting of a cyclohexane tricarboxylic acid trihalide, 1,2,3-propane tricarboxylic acid trihalide, 1,2,3,4-butane tetracarboxylic acid tetrahalide, 1,2,4,5-pentane-tetracarboxylic acid tetrahalide, 1,3-cyclohexane dicarboxylic acid halide, and 1,4-cyclohexane dicarboxylic acid halide.

6. The process of claim 1, wherein the first aliphatic monomer is a cyclohexane diamine and the second aliphatic monomer is a cyclohexane tricarboxylic acid halide.

7. An asymmetric semi-permeable membrane comprising
   a) a porous substrate; and
   b) a barrier layer consisting essentially of a cross-linked polymerizate of
      i) a first aliphatic amine monomer;
      ii) a second aliphatic amine monomer;
      iii) an aliphatic acid chloride monomer,
wherein the membrane, when challenged at room temperature and at a trans-membrane pressure difference of about 225 pounds per square inch, is characterized by sodium chloride rejection of less than 50% in a challenge with water containing 2000 milligrams sodium chloride per liter;
   magnesium sulfate rejection of more than 50% in a challenge with water containing 2000 milligrams magnesium sulfate per liter; and
   a stable non-zero flux in a challenge with whey.

8. The membrane of claim 7, wherein the first and second amine monomers are seected from the group consisting of a cyclohexane diamine, tetraethylene pentamine, ethylene diamine, a diaminopropane, a diaminobutane, a diaminopentane, a diaminohexane, a diaminoheptane, a diaminooctane, a diaminononane, a diaminodecane, diethylene triamine, a dipropylene triamine, a dibutylene triamine, triethylene tetramine, a tripropylene tetramine, a tributylene tetramine, pentaethylene hexamine, a diamino cyclobutane, a diamino cyclopentane, a diamino cycloheptane, a diamino cyclooctane, guanidine, aminoethyl piperazine, an imino bis propyl amine, bis-(p-amino cyclohexyl) methane, N,N'-bis-(3-amino propyl)-1,4-butane diamine, a menthane diamine, 1,4-diamino-2-butanone, a diaminododecane, diamino-2-hydroxy propane, and trisaminoethyl amine.

9. The membrane of claim 7, wherein the acid halide is selected from the group consisting of a cyclohexane tricarboxylic acid trihalide, 1,2,3-propane tricarboxylic acid trihalide, 1,2,3,4-butane tetracarboxylic acid tetrahalide, 1,2,4,5 -pentane-tetracarboxylic acid tetrahalide, 1,3-cyclohexane dicarboxylic acid halide, and 1,4-cyclohexane dicarboxylic acid halide.

10. A membrane according to claim 7 in which said barrier layer consists essentially of a polymerizate of a mixture of a cyclohexane diamine and tetraethylene pentamine with a cyclohexane tricarboxylic acid halide.

11. A process for separating a fluid mixture into less permeable and more permeable fractions, said process comprising contacting said fluid mixture under pressure with the barrier layer of a membrane according to claim 7.

12. Apparatus for separating a fluid mixture into less permeable and more permeable fractions, said apparatus comprising a membrane according to claim 7 and also comprising means for contacting said fluid mixture under pressure with the barrier layer of said membrane.

* * * * *